United States Patent
Brooke

(10) Patent No.: US 8,425,647 B1
(45) Date of Patent: Apr. 23, 2013

(54) SELECTING AND MIXING PLANT FERTILIZER COMPONENTS BASED ON COLOR

(75) Inventor: Lawrence L. Brooke, Sebastopol, CA (US)

(73) Assignee: Lawrence Brooke Engineering, LLC., Roseburg, OR (US)

( * ) Notice: Subject to any disclaimer, the term of this patent is extended or adjusted under 35 U.S.C. 154(b) by 249 days.

(21) Appl. No.: 12/507,596

(22) Filed: Jul. 22, 2009

(51) Int. Cl.
*C05D 9/02* (2006.01)
*C05F 11/00* (2006.01)
*A01N 25/00* (2006.01)

(52) U.S. Cl.
USPC ...... 71/11; 71/1; 71/64.01; 71/64.1; 71/64.13

(58) Field of Classification Search ... 71/1, 64.01–64.13
See application file for complete search history.

(56) References Cited

U.S. PATENT DOCUMENTS

| 1,513,542 A | 10/1924 | Flagg |
| 2,452,385 A | 10/1948 | Merckel |
| 4,126,417 A | 11/1978 | Edwards |

FOREIGN PATENT DOCUMENTS

| JP | 2003112990 A | * | 4/2003 |
| KR | 100601721 | * | 7/2006 |

* cited by examiner

*Primary Examiner* — Kaj K Olsen
*Assistant Examiner* — Jennifer Smith
(74) *Attorney, Agent, or Firm* — Brooks Acordia IP Law, PC; Pejman Yedidsion; Christopher Weiss

(57) ABSTRACT

Colorized components of a fertilizer concentrate blend may be apportioned according to a reference hue that may be associated with a target plan growth cycle and the apportionment may be refined according to referenced and measured electrical conductivity values of the blend in progress.

4 Claims, 3 Drawing Sheets

| DAY | FERTILITY COLOR REFERENCE HUE | CONCENTRATION |
|---|---|---|
| 1 | BLUE + YELLOW → GREEN | 800 ppm<br>e.g., 1.6 mS/cm |
| 10 | BLUE + YELLOW → BLUE GREEN | 780 ppm<br>e.g., 1.56 mS/cm |
| 19 | BLUE | 710 ppm<br>e.g., 1.42 mS/cm |
| 28 | RED + BLUE → PURPLE | 610 ppm<br>e.g., 1.22 mS/cm |
| 35 | RED | 605 ppm<br>e.g., 1.21 mS/cm |

| DAY | FERTILITY COLOR REFERENCE HUE | CONCENTRATION |
|---|---|---|
| 1 | BLUE + YELLOW → GREEN | 800 ppm<br><br>e.g., 1.6 mS/cm |
| 10 | BLUE + YELLOW → BLUE GREEN | 780 ppm<br><br>e.g., 1.56 mS/cm |
| 19 | BLUE | 710 ppm<br><br>e.g., 1.42 mS/cm |
| 28 | RED + BLUE → PURPLE | 610 ppm<br><br>e.g., 1.22 mS/cm |
| 35 | RED | 605 ppm<br><br>e.g., 1.21 mS/cm |

Fig. 1

SELECTING AND MIXING PLANT FERTILIZER COMPONENTS BASED ON COLOR

BACKGROUND

1. Technical Field

The present invention relates to blending plant fertilizer constituents and more particularly, the present invention relates to tailoring the ratio of nutrients in a fertilizer composition by colorizing fertilizer constituents according to their nutrient content and mixing the colorized fertilizers until the resultant color matches a reference color associated with a desired fertilizer composition.

2. State of the Art

Plants are harvested for a variety of useful products. Although some plants are coveted for their leaf such as spinach and lettuce, the stalk such as asparagus, and the root such as carrots, most plants are useful for some aspect of their reproductive cycle, such as the flowering portion (roses), the fruit such as avocado, and the seed such as corn and wheat. In addition to water and carbon dioxide that plants require to grow, plants also require minerals to grow in a healthy manner, and to provide us with those nutrients that are essential to our own health. These minerals are normally absorbed through the roots, though in some cases foliar application is effective. Although the specific needs and relative proportions of nutrients needed by different species of plants may vary, as a general rule, all plants require the same nutrients. The necessary proportions, however, vary from specie to specie, as well as throughout the life cycle of a plant. Environmental ranges of light, temperature, humidity, airflow, etc. can also have a controlling effect on ideal nutrient composition for various crops in their range.

"Primary nutrients" include nitrogen, phosphorus, and potassium, commonly referred by the triplet "NPK." These are called primary because they are usually needed in the greatest proportion relative to other nutrients. "Secondary nutrients" include calcium, magnesium, and sulfur, usually in the form of sulfate. Trace element needs include iron, manganese, zinc, copper, boron, chloride, and molybdenum. Though the studies are in their formative stages, more recent evidence shows that cobalt, silicon, nickel and chloride are also needed, or helpful to plant growth, in trace amounts. The secondary nutrients are typically required in lesser quantities than the primary nutrients, but higher quantities than the trace elements. There is, however, some overlap. For example, calcium, listed above as a secondary nutrient, is often needed in higher quantities than phosphorus.

The required levels for some nutrients remain fairly stable over the life cycle of the plant. For other nutrients, however, the requirement levels vary significantly throughout the life cycle. Accordingly, the production of a healthy leaf at the beginning of a life cycle may have significantly different nutritional needs than the production of flower, fruit, or seed near the end of the life cycle.

Most plants are satisfied by a balance of nutrients at levels that remain fairly stable over the life of the plant. A few nutritional requirements, however, such as nitrogen, phosphate and magnesium often have a wide range of variation over the life of a plant for optimum growth, vigor, and yield. Young plants require high levels of nitrogen to enable their early structural growth of roots, stems, and foliage. At a later stage in a plants growth, such as the flowering, fruiting or seed production stages, the need for nitrogen decreases significantly. Simultaneously, the need for other nutrients may increase throughout the life of a plant. For example, phosphate and magnesium are important for flowering, and the required levels frequently increase during this stage of development. Because of this, it is not possible to maintain nutrients at optimal simply by increasing or decreasing the strength, or concentration, of a single general purpose fertilizer. The ratio between elements and their variation throughout the plant's lifecycle is a key to optimum growth and productivity.

As a consequence, gardeners, farmers, horticulturists and other plant growers collectively referred to herein as "growers," will typically apply a variety of fertilizers throughout the life of a plant. Our method provides a simple building-block method for the grower to easily mix a huge range of precise fertilizer blends.

The first problem is the life cycle of a plant. It is not as if the plant shifts from one stage to another in digital fashion. The process is an analog one, where the need for one nutrient decreases gradually as the need for another gradually increases. The more frequently the formula is adjusted throughout a plant's life, the more closely the mixture can follow the optimal ratio. Additionally, there is the problem of plant types. Different types of plants have different needs throughout their life cycle. To optimally meet the nutritional needs of the multiple stages of a life cycle for hundreds of different types of plants, over a range of environmental variations like field and greenhouse, summer, and winter, requires many different fertilizer formulas. Because it is not practical to manufacture, purchase or store an exhaustive or even extensive range of different fertilizer formulations, growers commonly try to formulate optimal, or near optimal mixtures by mixing a handful of basic fertilizer products in different ratios throughout the life cycle of a plant. Typically the measuring and mixing is by weight percentages, or may be volumetric for less sophisticated growers. There are drawbacks of such mixtures, however. A first drawback is that an optimal mixture is seldom a simple integral ratio of small numbers, such as "three parts of a first fertilizer and two parts of a second fertilizer." If an optimal ratio is closer to one hundred to one, and the grower does not need one hundred measures of fertilizer, the grower scales back the total amount of fertilizer and "eye-balls" the amounts used. The process immediately becomes an inexact science, forming a sub-optimal fertilizer. Another problem with volumetric measuring is that granulated solids, particularly fertilizers, can "clump" together, upsetting the measured volume required for an ideal ratio. Variations in the densities of fertilizers can occur through settling, impurities, and a variety of other causes. Moreover, in large commercial operations, fertilizers may not be placed in tidy graduated flasks before mixing. They can be dumped together from large bins or scoops lacking exact gradations, or being filled in very rough and inexact amounts. Air pockets can also form in a volume, affecting the actual amount of fertilizer used. Another problem with volumetric mixing is the language barrier. For example, in growing hydroponic tomatoes, the same fertilizer may be marketed in Mexico, Iran and China. Instructions for optimal fertilizer mixtures in Spanish will be of little value in Chinese or Farsi. In short, volumetric mixing of fertilizer formulas to obtain a particular formula for a particular stage of life of a particular plant can be inexact, tedious, boring, and difficult to communicate from language to language.

Coloring in the prior art includes U.S. Pat. No. 1,513,542 to Flagg. which is directed to using color coding to determine an amount of hemoglobin in the blood. U.S. Pat. No. 2,452,385 to Merckel relates to test apparatus for testing chemical presence and concentrations using colors. A translucent container has a colored translucent band around an upper portion of the container to serve as a color comparator against a solution within the container. Because the band is translucent, the light passing through the band serves as a concentration comparator as well. The apparatus can be used to test free chlorine in water, or can be used to test soils for mineral content such as nitrogen or potash. The soil sample is mixed in water with an indicator selected to react with the nitrogen or other mineral to produce a color. As the soil settles on the bottom, the color of the liquid can be compared to the colored band. Merckel teaches chemical alteration of a small test sample, not the entire target substance. Merckel selects a testing agent which produces certain shades and colors when it reacts with chemicals already in the sample substance. This testing agent may or may not produce a specific color, depending on the presence of underlying chemicals in the target substance. U.S. Pat. No. 4,126,417 to Edwards is directed to a testing and treatment kit for soil pH and nitrate levels. A stick with color coding allows the user to match a pH level or nitrate level to a color to determine concentrations. Pills can then be dissolved in water to adjust the pH or nitrate content of the soil. To distinguish nitrate enhancing pills from acid enhancing pills, nitrate enhancing pills are colored differently than acid enhancing pills. Modern commercial growers use ionic detection with computers to determine and maintain optimum nutrient character and strength at considerable cost and complexity. Examples of such complex system include the Priva™ Nutriflex™ and Priva™ Nutrifit™ systems from Priva B.V., The Netherlands; systems that may be used to control nutrients for state-of-the-art hydroponic greenhouses.

SUMMARY

The present invention is directed to a method and apparatus for tailoring the ratios of specific nutrients in a fertilizer to match the ideal needs of a plant at a particular stage of the life cycle, and/or under specific environmental conditions, by combining pre-existing fertilizers. The present invention provides for determining when a proper ratio of nutrients has been reached by mixing pre-existing fertilizers having different coloring agents and comparing a resultant hue with a reference hue in a look-up table. Embodiments of the present invention allow for the tailoring of nutrients for environmental phenomena as well as plant physiology.

The invention, in its several embodiments may include an industrial process of preparing a plant fertilizer comprising (not necessarily in the following order): (a) providing two or more colorized plant fertilizer concentrate components; (b) determining a reference hue for a concentrate blend of the two or more colorized plant fertilizer concentrate components; (c) blending a first portion of a first colorized plant fertilizer concentrate component of the two or more colorized plant fertilizer concentrate components with a first portion of a second colorized plant fertilizer concentrate component of the two or more colorized plant fertilizer concentrate components to make the concentrate blend having a resulting hue; and (d) adding to the concentrate blend, based on a difference between the reference hue and the resulting hue, at least one of: a second portion of the first colorized plant fertilizer concentrate component of the two or more colorized plant fertilizer concentrate components and a second portion of the second colorized plant fertilizer concentrate component of the two or more colorized plant fertilizer concentrate components. For some embodiments of the process, the first colorized plant fertilizer concentrate may be diluted into a first volume of water, the second colorized plant fertilizer concentrate may be diluted into a second volume of water, and the step of adding to the concentrate blend is further based on the first volume of water and the second volume of water. For some embodiments of the process, the first colorized plant fertilizer concentrate may be characterized by a specific gravity, the second colorized plant fertilizer concentrate may be characterized by a specific gravity, and the step of adding to the concentrate blend may be based on the specific gravity of the first colorized plant fertilizer concentrate and the specific gravity of the second colorized plant fertilizer concentrate.

In addition, the exemplary process embodiment may include steps of: (a) providing a reference electrical conductivity value for the concentrate blend; and (b) adding to the concentrate blend, based on a difference between the reference electrical conductivity value and a measured electrical conductivity value of the concentrate blend, at least one of: an additional portion of the first colorized plant fertilizer concentrate component of the two or more colorized plant fertilizer concentrate components and an additional portion of the second colorized plant fertilizer concentrate component of the two or more colorized plant fertilizer concentrate components.

An exemplary computing device embodiment of the present invention may include a processing unit and addressable memory, where the processing unit is configured to execute one or more instructions to (not necessarily in the following order): (a) determine a reference hue for a concentrate blend of two or more colorized plant fertilizer concentrate components; (b) generate a dispensing signal for a first valve to dispense a first portion of a first colorized plant fertilizer concentrate component of the two or more colorized plant fertilizer concentrate components; (c) generate a dispensing signal for a second valve to dispense a first portion of a second colorized plant fertilizer concentrate component of the two or more colorized plant fertilizer concentrate components to make a concentrate blend having a resulting hue; (d) generate, based on a difference between the reference hue and the resulting hue, at least one of: a dispensing signal for the first valve to dispense a second portion of the first colorized plant fertilizer concentrate component of the two or more colorized plant fertilizer concentrate components and a dispensing signal for the second valve to dispense a second portion of the second colorized plant fertilizer concentrate component of the two or more colorized plant fertilizer concentrate components. The exemplary computing device may be further configured to execute one or more instructions to: (a) determine a reference electrical conductivity value for the concentrate blend; and (b) generate, based on a difference between the reference electrical conductivity value and a measured electrical conductivity value of the concentrate blend, at least one of: a dispensing signal for the first valve to dispense an additional portion of the first colorized plant fertilizer concentrate component of the two or more colorized plant fertilizer concentrate components and a dispensing signal for the second valve to dispense an additional portion of portion of the second colorized plant fertilizer concentrate component of the two or more colorized plant fertilizer concentrate components. The processing unit of the exemplary computing device may be further configured to execute one or more instructions to determine a reference hue for a concentrate blend of two or more colorized plant fertilizer concentrate components based on at least one of: temperature, humidity, light intensity, available carbon dioxide, level of insect attack, and a level a disease attack. For example, a hot and dry environment may retard interplant calcium mobility and so the processor may be responsive to hot and dry conditions by increasing the proportion of calcium in the concentrate.

BRIEF DESCRIPTION OF THE DRAWINGS

Embodiments of the present invention are illustrated by way of example and not limitation in the figures of the accompanying drawings, and in which:

FIG. 1 is a sample look-up table for use in conjunction with the claimed invention;

DETAILED DESCRIPTION

Figure 2:
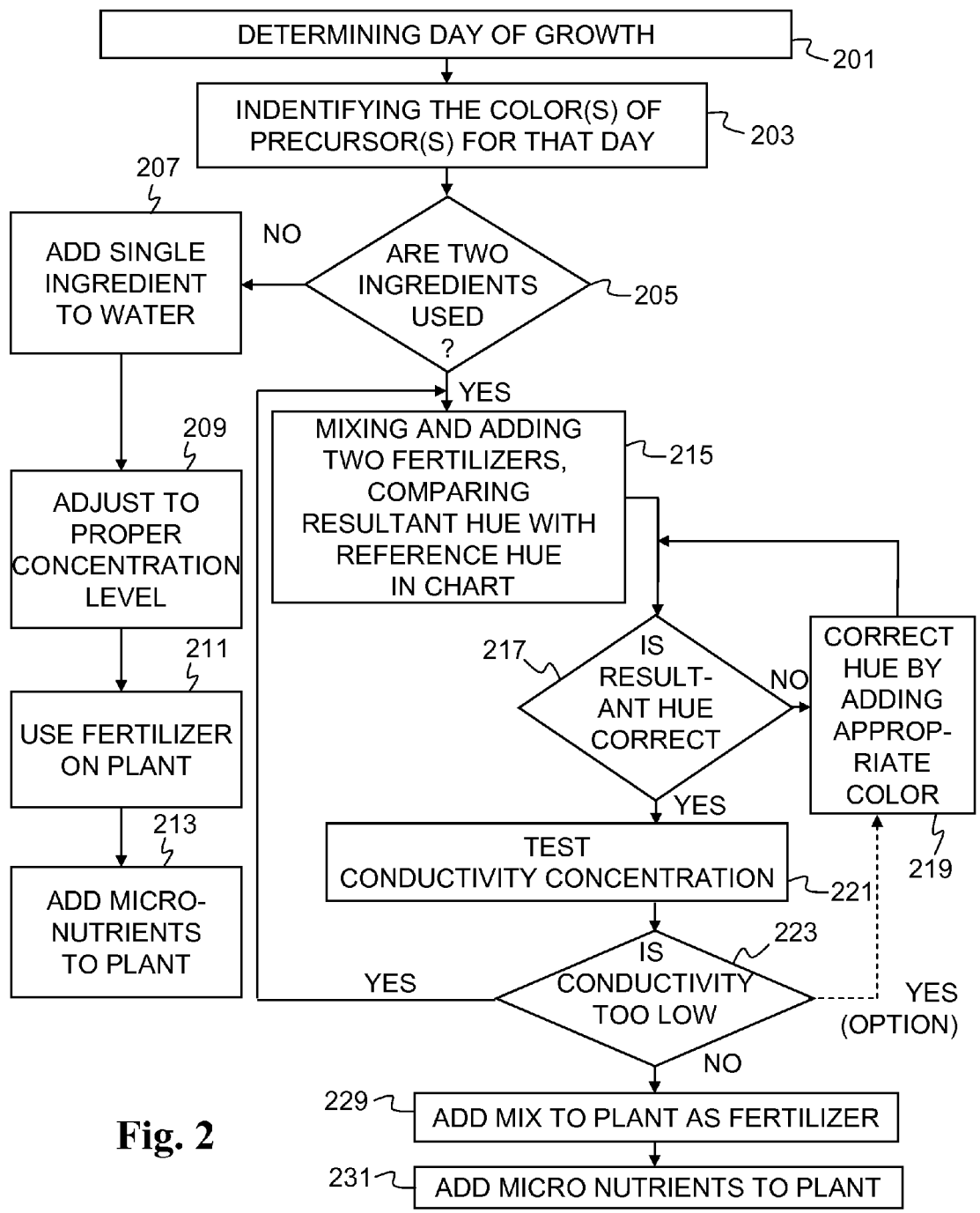
FIG. 2 is a flow chart of a process of mixing fertilizer according to the claimed invention.

The present invention is directed to a method and apparatus that allows growers to mix at least two pre-formulated fertilizer products together in a select ratio to produce a third fertilizer product having a select ratio of nutrients. One advantage of the present invention is that, rather than having hundreds of pre-formulated fertilizers; a small number can serve as precursors for a wide variety of mixtures.

A method of fertilizing plants comprises the steps of mixing a first coloring agent into a first pre-formulated fertilizer having a first nutrient profile; mixing a second coloring agent into a second pre-formulated fertilizer having a second nutrient profile distinct from the first nutrient profile; mixing a first amount of the first pre-formulated fertilizer and second amount of the second pre-formulated fertilizer together to form a first fertilizer mixture having a third nutrient profile; forming a first aggregate hue according to a mixture of the first and second coloring agents in the first fertilizer mixture; comparing the first aggregate hue to a reference hue; determining that a variation exists between the first aggregate hue and the reference hue. The step of comparing may be performed by a digital computer, or by a human agent.

According to one embodiment, the method further comprises the steps of determining from the variation that an addition of the first pre-formulated fertilizer to the first fertilizer mixture is required to conform the first aggregate hue to the reference hue; and adding more of the first fertilizer to the first fertilizer mixture. The first mixture is placed in an aqueous solution and the conductivity is measured to determine a concentration of the first mixture. If the concentration is too low, more of said first fertilizer and more of said second fertilizer are added to the first fertilizer mixture.

The color mixing may be done with concentrates to make a blend of tailored concentrate that may be specialized for various crops and/or particular growth stages of one or more particular crops. Accordingly, the resulting color is indicative of the preferred application of the concentrate blend. For example, a resulting color of a concentrate blend may be keyed to a color indicating the presence of nitrogen in a growth-oriented formulation while another resulting color of a concentrate blend may be keyed to a color indicating the presence of phosphate and/or magnesium in a reproductive-oriented formulation. After a desired color of the concentrate blend is achieved, that concentrate blend may then be added to water to make a solution for application purposes, i.e., a user solution. A specialized concentrate blend may be further blended, i.e., diluted, with water volumetrically, or by weight, to make a user solution. A conductivity meter can yield approximations of a solution's strength but is not a precise indicator of elemental parts-per-million (ppm) since different components and derived blends have varying conductivity. Nonetheless our method still enables growers to achieve functional precision since the reference charts take into account the variations of conductivity/elemental content. For example, monopotassium phosphate and magnesium sulfate, while typically ingredients of fruiting or flowering formulas, show poor conductivity. Diluting instructions and/or conductivity meter readings may be addressed by tables to aid growers, as users, to estimate nutrient strength.

A third fertilizer comprises nutrients selected from among a group consisting of nitrogen, calcium, iron, manganese, zinc, molybdenum, cobalt, nickel and chloride. The third pre-formulated fertilizer is preferably added to the aqueous user solution by itself directly before or after the colorized blends are added. Preferably, the non-colorized fertilizer should not be added to any of the colorized fertilizers in concentrated form to avoid the mix precipitating calcium or magnesium phosphate. More particularly, the calcium is preferably kept separate until dilution in water of the colorized blend or non-colorized fertilizer. So generally, the third pre-formulated fertilizer may be mixed with the first fertilizer mixture to form a second fertilizer mixture prior to applying to plant roots, or after the first mixture has been applied to plant roots. The first fertilizer preferably comprises nutrients selected from among a group of nutrients consisting of nitrogen, phosphorous, potassium, calcium, magnesium and a sulfur compound. The first fertilizer mixture is applied to roots of a plant at a time corresponding to first stage of growth of the plant. An embodiment further comprises the steps of preparing a second fertilizer mixture according to a second reference hue color; and applying the second fertilizer mixture to the plant roots at a time corresponding to second stage of growth of the plant.

A fertilization system comprises a first pre-formulated fertilizer that is impregnated with a first coloring agent; a second pre-formulated fertilizer that is impregnated with a second coloring agent; and a color look-up table including a first hue configured to match a hue that will result from combining the first pre-formulated fertilizer and the second pre-formulated fertilizer at a first predetermined ratio.

The look up table further includes a correlation of the first hue with a type of plant and a first stage of growth in a life of the plant, and an optimal concentration of the first mixture. The look up table can represent the first hue in digital format, or in a colorized format that is sensibly perceived by a person.

A third pre-formulated fertilizer is impregnated with a third coloring agent. The look-up table includes a second hue representing a hue created by a mixture of the first pre-formulated fertilizer and the third pre-formulated fertilizer at a second predetermined ratio. The second hue within the look-up table corresponds to a second stage of growth in the life of the plant. The color look-up table further includes a third hue representing a hue created by a mixture of the second coloring agent and the third coloring agent at a third predetermined ratio, the third hue within the look-up table corresponding to a third stage of life of a plant.

Experimental results indicate that for a two-part colorized formula—with or without an additional non-colorized blend containing the micro-nutrients, added separately to the water—a "grow blend," i.e., a blend that may be comprised of a high proportion of nitrogen and a low concentration of phosphate, may be yellow in color and the "bloom blend," i.e., a blend that may be comprised of a low proportion of nitrogen and high proportions of phosphate and magnesium may be blue or red in color. This results in a yellowish green color for a blend that may be termed "Grow" comprising a "grow blend" and micronutrients, and a bluish green color for a blend that may be termed "Bloom" comprising a "bloom blend" and micronutrients. An exemplary alternative coloring produces a grow blend that is blue and a bloom blend that is red. Micronutrients may include copper which adds a blue coloring and may include iron which adds a red coloring. Accordingly, adding the micronutrients into the two-part colorized blend may yield a bluish purple for Grow and a reddish purple for Bloom.

In a three-part colorized blend with a fourth non-colorized blend containing micro-nutrients, a balanced blend may have a blue color. In this example, the concentrates are in the primary colors of Yellow, Blue and Red. In this example, yellow may be used for the Grow enhancer, and red may be used for the Bloom enhancer. This results in an exemplary protocol where: the grower starts the plants with a yellowish-green, and transitions through pure green, and later bluish-green, and then pure blue. When reproductive growth is indicated, the grower may mix a bluish-purple transition to a reddish-purple, and may finish the cycle with a mix of pure red. For unique situations yellow can be mixed with the red to make ranges of orange. For example, the orange colored blend may be used as a foliar spray to help with unique nutrient needs, i.e., for orchids.

Recent tests have produced successful blends all necessary elements, including the reactive Calcium and color-difficult elements, e.g., the rust color of iron and the blue color of copper, into a two part complete mix. The color blue may be used for the grow mix—including the copper since it is blue; and the color red may be used for the bloom mix with the iron. If these two concentrates are mixed together directly, they precipitate calcium phosphate. Preferably, one dilutes of a first concentrate in a container with two to four times its volume with water followed by a dilution of a second concentrate in the same container. Accordingly, a resulting semi-concentrate becomes sufficiently diluted to prevent the precipitation and the color is good for comparison to the reference tables. Now we have a unique colorized semi-concentrate that may be mixed with water volumetrically or using conductivity meter to make a 'user' blend.

The fertilizer system may be embodied with two or more colorized pre-formulated fertilizer products. For example, a fertilizer system embodiment may comprise two or three colorized pre-formulated fertilizer products, as well as a third and/or a fourth non-colorized pre-formulated fertilizer product. For a three-color embodiment, the three colorized products may be colorized according to the primary colors red, yellow and blue for reasons that will be explained herein. For a two-color embodiment, the two colorized products may be colorized according to the colors blue and yellow and may be mixed according to color guide ranging from blue, through the many shades of green to yellow.

The first pre-formulated fertilizer product discussed herein will be designated as "General Purpose" formulation, for this example. The General Purpose formulation is a "middle of the road" fertilizer, with a good balance of primary and secondary nutrients discussed above. For exemplary purposes, the coloring agent selected herein for the General Purpose formulation is blue. The General Purpose formulation will normally serve as a "base" fertilizer, which may be supplemented with one of two other pre-formulated colorized fertilizers to form an optimal fertilizer for different plant species at different stages of growth.

The second pre-formulated fertilizer product, herein designated "enhancer" formulation, is basically a nitrogen supplement. It is typically added to another fertilizer, principally to enhance nitrogen. For exemplary purposes, the coloring agent selected herein for the Enhancer formulation is yellow. In some formulation, one may add calcium and/or sulfur and/or some micro-nutrients to the yellow "enhancer" and use it by itself—typically to overcome nitrogen deficiency or as a foliar spray, as may be typical of the two-part complete colorized blend embodiments.

The third pre-formulated fertilizer product herein designated the "Ripen" formulation, is high in phosphorous, magnesium, sulfate, and relatively high in potassium. It has little or no nitrogen. The Ripen formulation is mixed with a red coloring agent. If mixed with the General Purpose formulation, it decreases the ratio of available nitrogen, and increases the ratio of phosphorous in the fertilizer.

In addition to the colorized mixes, various micro-nutrients are included in a fourth mixture of fertilizer. Although calcium is not regarded as a micro-nutrient, because of its chemical reactivity, it is often included in the micro-nutrient mixture. Preferably, calcium nitrate is applied as a soluble calcium source, and this means that the fourth non-colorized blend also contains nitrogen. Some gardeners will use this non-colorized blend plus the red blend to make a very strong user mix for flowering, fruit or seed production when they want to nutritionally encourage the plants, i.e., a final harvest mix. If calcium is stored in a formulation containing phosphorous, it will typically turn into a non-soluble phosphate that is not biologically available to plants. This makes it impractical to add calcium to the General Purpose formulation or the Ripen formulation, both of which contain phosphorous, except in minor amounts. Although calcium could probably be added safely to the Enhancer formulation, a plant's need for calcium over the life cycle remains far more stable than the need for nitrogen. The Enhancer formulation may be used to provide enhanced nitrogen in high levels early in a plant's development, and curtailed around mid cycle. If calcium were therefore to be delivered in conjunction with the Enhancer formulation, a plant would receive excessive calcium in its early stages, and be starved of calcium in its later stages of growth. For this reason, it has been found to be advantageous to include most of the required calcium in the formulation of micro-nutrients. This prevents the calcium from becoming biologically unavailable to the plant, insures that the levels of calcium remain sufficiently stable through the life of a plant since the micronutrient formulation is used consistently through the plants life.

A micro-nutrient such as copper turns a water-based solution blue and a micro-nutrient such as iron turns a water-based solution a caramel color. Because a micro-nutrient combination of iron and copper can turn a water-based solution a caramel-brown in water, it is difficult to colorize them with a color that will not be overpowered in appearance by the natural caramel-brown color, and laboratory results have yielded red blends with iron. Moreover, since the need for micro-nutrients is substantially invariant over the life of most plants, specialized blending is largely unnecessary.

FIG. 1 illustrates a comparison chart or look-up table that is prepared showing hues which are produced at particular mixtures of any two of the three colored precursors discussed above. The comparison chart lists a type of plant, such as a tomato. Embodiments are envisioned wherein a single chart may list multiple plants in parallel columns. The comparison chart correlates a reference hue to a day or week of growth, and also correlates the proper concentration to the listed day. According to the exemplary look up table of FIG. 1, Day 1 is correlated to the color green, and to a concentration level of 800 ppm. The formulation of this color is illustrated as being a combination of the blue, or General Purpose formulation, and the yellow, or Enhancer formulation. That is, at the beginning of the plant's life, it requires the balanced General Purpose formulation, which is colored blue, but must be supplemented by extra nitrogen to facilitate the intense growth of green leaves and stems. The exact green hue depicted in the look-up chart is achieved by mixing the General Purpose formulation with the Enhancer formulation at an exact ratio. By blending a fertilizer until an exact color match is achieved, the ratio of nutrients in the blended fertilizer can be controlled very exactly, for this example.

Although the chart of FIG. 1 depicts the word "green" rather than the actual color, it is understood that, in actual application, look-up tables for use by growers will depict a visual or sensible reference hue corresponding to the proper mixture of fertilizer, not simply the word "green." The grower can then visually compare the color of the fertilizer mixture under preparation with the reference hue in the look-up table, adding more of one ingredient or another until the mixture's color matches the reference hue. It has been estimated that the human eye can distinguish perhaps a million colors. As a result, a very accurate mixture is possible by preparing a tailored fertilizer to match the reference hue in the look up table. In look-up tables used by computers in process control applications, the reference hue corresponding to the proper mixture of fertilizer is advantageously depicted in a binary code. However, because background lighting in factory environments is not constant, embodiments are envisioned wherein a photo-sensitive examination of a fertilizer mixture by a computer will be accompanied by a fresh examination of a visual reference hue in a look up table, and a generation of a new binary code, rather than a comparison against a pre-existing binary code. That is, computer-controlled coloring of the concentrate blend may be embodied via a light sensor, e.g., a charge-coupled device (CCD), having sensitivity across at least a portion of the color spectrum, that may be combined with light color intensity feedback and reference intensity levels in order to effect input valves controlling the addition of constituent colorized ingredients. Electrical conductivity may be expressed in millisiemens (mS) per centimeter (cm) or microsiemens (µS)/cm. An aqueous sodium chloride solution having a concentration of 500 parts per million (ppm) of sodium chloride has an electrical conductivity of about 1 mS/cm.

The reference hue correlating to an exemplary Day 10 may be a blue-green hue, and to a concentration level of 780 ppm, e.g., an electrical conductivity measurement of 1.56 mS/cm. This exemplary stage illustrates that the need for nitrogen is still greater than the percentages present in the General Purpose formulation, but the amount of Enhancer formulation added on Day 10 is less than what was added on Day 1.

The reference hue correlating to Day 19 is the blue color, and refers to a concentration level of 710 ppm, e.g., an electrical conductivity measurement of 1.42 mS/cm. Because the chart indicates that there is only one ingredient, no balancing of colors is required in mixing. The only requirement will be to add the proper amount of General Purpose formulation to produce the correct concentration according to a process described in FIG. 2, for this example. The use of the unblended General Purpose formulation indicates that the nutritional requirements of the plant are "balanced" between leaf production and flower/fruit/seed production.

The reference hue correlating to Day 28 is a purple hue, and the concentration level is 610 ppm, e.g., an electrical conductivity measurement of 1.22 mS/cm. Purple is achieved by adding red and blue together. As discussed above, the red or Ripen formulation contains no nitrogen, and is particularly high in phosphorous, potassium, magnesium and sulfate. By adding the Ripen formulation to the General Purpose formulation, the aggregate levels of nitrogen are reduced below the General Purpose formulation, and the aggregate levels of phosphorous, potassium, magnesium and sulfate are increased above the basic levels found in the General Purpose formulation.

The reference hue correlating to Day 35 is the red color of the Ripen formulation, un-blended with any blue. The concentration level is 605 ppm, e.g., an electrical conductivity measurement of 1.21 mS/cm. As noted above, the Ripen formulation has no nitrogen, but has elevated levels of potassium and phosphorous which are essential for the fruit/seed bearing stages of many plants. As discussed, a mixture of micro nutrients is preferably added separately, or added to the mixture after the color balancing has been performed. The specific details of the above cycle, including the length of days between life cycle events, specific ratios of tailored fertilizer formulations, and concentration levels, are exemplary, but illustrate many features of the present invention.

An advantage of using four precursors or pre-formulated fertilizer mixtures according to the above illustration is that most tailored mixtures for various plant types may be created by mixing only one or two of the artificially colored mixtures together, plus the non-colorized, naturally caramel colored micro-nutrient precursor. It may be readily understood by those familiar with spectral colors that a continuous spectrum exists between any two primary colors, such as blue and yellow, blue and red, or yellow and red. As a result, by mixing two primary colors, if the desired reference hue is not instantly achieved, it is plain to the casual observer which of the two coloring agents must be added to transform the mixture to the desired reference hue. In contrast, if three color combinations were used and the desired hues were not achieved, it would not be so intuitively obvious which ingredients should be increased. Accordingly, the pre-formulated mixtures are advantageously either used individually, or mixed two at a time, but not three at a time. Because a very natural spectrum occurs between primary colors, the colorized pre-formulated mixtures will preferably be colorized according to the three primary colors of the spectrum, yellow, red and blue. However, the use of other coloring agents is envisioned in conjunction with the present invention. From the above example, it is understood that non-colorized formulations such as the micro-nutrients are not added until the color balancing are completed, including arriving at the proper concentration. However, since the micro-nutrients are eventually used to nourish the same plant, at some point they will be combined with the colorized mixture in final aqueous solution. The application of diluted micro-nutrients to a single or colorized blend is preferred in order to minimize precipitation. That is, preferably the micro-nutrients are added to water separately and before added to the colorized blend, or the micro-nutrient may be added to an already diluted colorized blend.

FIG. 2 illustrates a flow chart illustrating an exemplary process of the present invention. This method embodiment is a process set to a calendar of days where a particular day in the growth cycle, i.e., the day of growth, is determined (step 201) and may be located within a look up table corresponding to the point in the life cycle of the plant being fertilized. This may be a day, such as the first day the plant is planted, or an event, such as two days after the beginning of bud formation.

Based on the determined day within the table lookup, identification (step 203) may be made of the associated colors that have previously been associated within the table with the pre-formulated fertilizer or fertilizers used at that point in time in the life cycle. A test (test 205) may be conducted to determine whether two or more colored ingredients are required. If only one pre-formulated fertilizer is used, then the single ingredient is added to water (step 207), and adjusts the concentration level may be adjusted, e.g., by adding incremental volumes of water and/or the single fertilizer (step 209) in to achieve a target concentration level as listed in the lookup table or a reference table or array of values that is preferable correlated to each reference hue. Concentration levels may be measured with an ammeter specifically calibrated to disclose PPM levels and/or Siemens/meter (S/m). Because different mixtures have different conductivity levels, a reading of an electrical conductivity measurement associated with 600 parts per million, i.e., approximately 1.2 mS/cm, for a mixture the green color of day one may actually have a concentration of 850 parts per million. The resulting mixture having its concentration level adjusted accordingly may then be applied as a plant fertilizer (step 211). Optionally, a mixture containing the micro-nutrients that are not colorized may be applied to the target plant or crops (step 213).

Returning to the test of two or more ingredients (test 205), if the lookup table entry determined day of growth indicates that two pre-formulated colorized ingredients are required, then two pre-formulated ingredients may be added together (step 215) and the resultant hue may be compared with the reference hue of the lookup table. If the resultant hue is not a match with the reference hue (test 217), e.g., by a color-based comparison and/or a conductivity comparison, the resultant hue may be adjusted (step 219) by adding portions of one or more of the pre-formulated colorized fertilizers having pigment required for hue adjustment. If the resultant hue of the mixture matches or is approximately close to the reference hue (test 217) on a color basis, the conductivity of the mixture may be tested (step 221) as a subsequent step. If the conductivity test (test 223) indicates that the conductivity is too low, then additional fertilizer of one or more types of ingredients (step 215) may be added or, as an option, adding one or more types of ingredients that also may affect the hue test results (step 219), may be repeated, thereby increasing the concentration level. If the conductivity is not too low (test 223), then the mixture of aqueous fertilizer may be added to the plant or crop (step 229), and, optionally or finally, and if so, preferably based on a separately diluted basis, the necessary micro-nutrients may be added to the aqueous or "user" solution to be given to the plant or crop (step 231).

Figure 3:
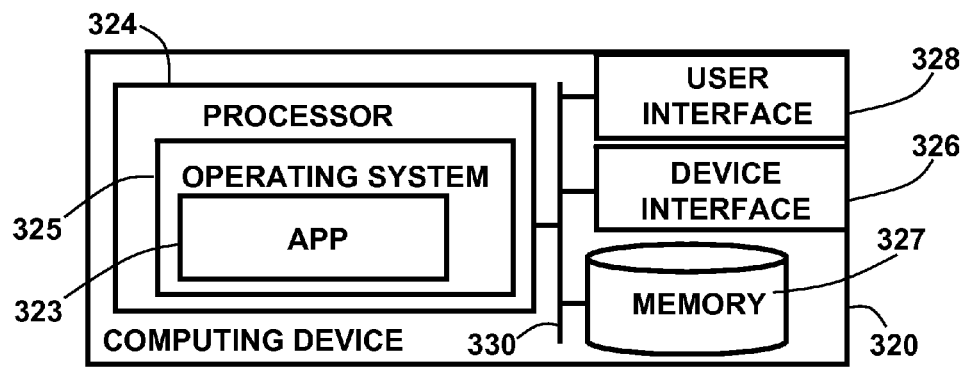
FIG. 3 is a functional block diagram of a computing device embodiment of the present invention.

FIG. 3 depicts a separate computing device as an alternative exemplary operating environment for the colorized fertilizer mixing control process as a portion of an exemplary embodiment of the present invention. The exemplary operating environment is shown as a computing device 320 comprising a processor 324, such as a central processing unit (CPU), addressable memory 327, an external device interface 326, e.g., a universal serial bus (USB) port and related processing, and/or an Ethernet port and related processing, and an optional user interface 328, e.g., an array of status lights and one or more toggle switches, and/or a display, and/or keyboard and/or pointer-mouse system and/or a touch screen. These elements may be in communication with one another via a data bus 330. Via an operating system 325 such as a real-time operating system (RTOS), the processor 324 may be configured to execute steps of a colorized fertilizer mixing based on reference conductivity values and/or color intensity levels, and feedback of conductivity measurements and/or color intensity levels according to a management application 323 according to the exemplary embodiments of the present invention.

Figure 4:
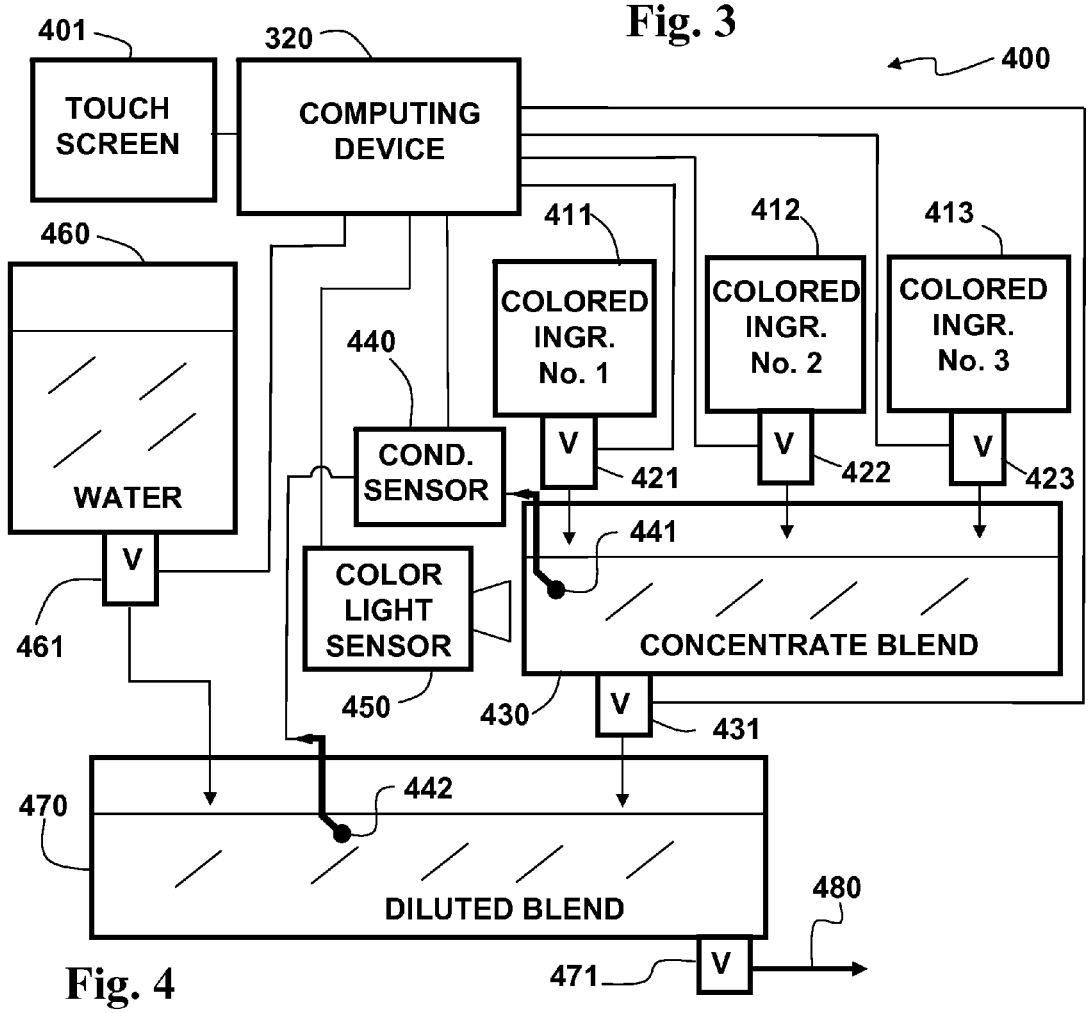
FIG. 4 is a system block diagram of an embodiment of the present invention.

FIG. 4 is an exemplary system depiction 400 of an embodiment of the present invention where a computing device 320 may have a user interface such as a touch screen 401 that displays the state of a concentrate blend 430 and/or a diluted blend 470. A user may start or stop the process and/or change reference settings via the exemplary touch screen 401. The system 400 includes one or more sources 411-413 of colored ingredients where the sources 411-413 each may have an output under the control of a valve 421-423 and each valve may be actuated by commands from the computing device 320. The system may include a conductivity processor or conductivity sensor/measuring device 440 that may be in communication with a conductivity probe 441 that may be submerged in the concentrate blend 430. The conductivity sensor/measuring device 440 also may be in communication with a conductivity probe 442 that may be submerged in the diluted blend 470. A color light sensor 450 such as a charge-coupled device (CCD) camera may in communication with the computing device 320 to provide feedback on the resulting hue of the concentration blend for display purposes and/or for regulation of the hue via the execution of one more valve 421-423 opening and closing commands of one or more colored ingredient sources 411-413. A water source 460 may feed, via a control valve 461 under the control of the computing device 320, to provide the principal volumetric component of the diluted blend 470. The concentrate blend 430 may feed, via a control valve 431 under the control of the computing device 320, to the diluted blend 470. The diluted blend 470 may be output 480 via a valve 471 that may or may not be under the control of the computing device 320.

The above method and apparatus of blending pre-formulated fertilizers into exact ratios according to color comparison has many notable advantages and benefits. On a mechanical level, as noted above, it avoids many of the liabilities and pitfalls associated with volumetric measuring such as inexact scoop size or filling, settling or clumping of a pre-formulated fertilizer, and calculating fractional ratios. Because of the incredible sensitivity and scope of the human eye, the blending of fertilizers according to a reference hue can be done with a high level of accuracy. In addition to these "mechanical" benefits, there is an aesthetic value in the color blending method. For example, school science projects commonly use colors to enhance comprehension, such as snap-together molecules using black for carbon, and other colors for oxygen, nitrogen and hydrogen. On a similar level, school science projects may use hydroponic plant growing to teach certain fundamentals of biology, and enhance the student's intuitive grasp of plant nutrients by having students mix optimal fertilizer blends from color impregnated fertilizer precursors as described above.

In some embodiments, micro-nutrients may be added together with the colored mix after color balance is achieved, or may be added to a plant separately. The process of adjusting the hue and the conductivity may be executed in an analog manner of continuously adding fertilizer and continuously monitoring the conductivity, rather than the step-by-step approach disclosed in the flow chart within FIG. 2. Colorized blend embodiments of the present invention may include non-nutrient additives such as plant growth regulators, which may comprise plant hormones, and these plant growth regulators may trigger special effects in growing plants, e.g., enhanced rooting, stem elongation, uniform flowering and fruit production. Colorized blend embodiments of the present invention may include pesticides that are used to deter insects and diseases, and may be staged concentrations according to a particular phase of growth of the target plant.

Alterations and variations may be made by those having ordinary skill in the art without departing from the spirit and scope of the invention. Therefore, it must be understood that the illustrated embodiments have been set forth only for the purposes of example and as such should not be taken as limiting the invention as defined by the following claims.

What is claimed is:

1. A process of preparing a liquid plant fertilizer comprising:
   receiving two or more colorized, pre-formulated, liquid plant fertilizer concentrate components;
   selecting a reference hue for a concentrate blend of the two or more colorized, pre-formulated, liquid plant fertilizer concentrate components;
   blending a first portion of a first colorized, pre-formulated, liquid plant fertilizer concentrate component of the two or more colorized, pre-formulated, liquid plant fertilizer concentrate components with a first portion of a second colorized, pre-formulated, liquid plant fertilizer concentrate component of the two or more colorized, pre-formulated, liquid plant fertilizer concentrate components to make the concentrate blend having a resulting hue; and
   adding to the concentrate blend, based on a difference between the reference hue and the resulting hue, at least one of: a second portion of the first colorized, pre-formulated, liquid plant fertilizer concentrate component of the two or more colorized, pre-formulated, liquid plant fertilizer concentrate components and a second portion of the second colorized, pre-formulated, liquid plant fertilizer concentrate component of the two or more colorized, pre-formulated, liquid plant fertilizer concentrate components.

2. The process of claim 1 wherein the first colorized, pre-formulated, liquid plant fertilizer concentrate is diluted into a first volume of water, the second colorized, pre-formulated, liquid plant fertilizer concentrate is diluted into a second volume of water, and wherein the step of adding to the concentrate blend is further based on the first volume of water and the second volume of water.

3. The process of claim 1 wherein the first colorized, pre-formulated, liquid plant fertilizer concentrate is characterized by a specific gravity, the second colorized, pre-formulated, liquid plant fertilizer concentrate is characterized by a specific gravity, and wherein the step of adding to the concentrate blend is further based on the specific gravity of the first colorized, pre-formulated, liquid plant fertilizer concentrate and the specific gravity of the second colorized, pre-formulated, liquid plant fertilizer concentrate.

4. The process of claim 1 further comprising:
   providing a reference electrical conductivity value for the concentrate blend; and
   adding to the concentrate blend, based on a difference between the reference electrical conductivity value and a measured electrical conductivity value of the concentrate blend, at least one of: an additional portion of the first colorized, pre-formulated, liquid plant fertilizer concentrate component of the two or more colorized, pre-formulated, liquid plant fertilizer concentrate components and an additional portion of the second colorized, pre-formulated, liquid plant fertilizer concentrate component of the two or more colorized liquid plant fertilizer concentrate components.

* * * * *